United States Patent [19]

Wick

[11] 4,348,239
[45] Sep. 7, 1982

[54] PROCESS FOR COLORING ORGANIC MATERIAL OF HIGH MOLECULAR WEIGHT

[75] Inventor: Arnold Wick, Therwil, Switzerland

[73] Assignee: Ciba-Geigy Corporation, Ardsley, N.Y.

[21] Appl. No.: 174,309

[22] Filed: Jul. 31, 1980

Related U.S. Application Data

[63] Continuation of Ser. No. 968,318, Dec. 11, 1978, abandoned.

[30] Foreign Application Priority Data

Dec. 29, 1977 [CH] Switzerland .................... 15572/77

[51] Int. Cl.³ .............................................. C08K 3/04
[52] U.S. Cl. ................................ 106/193 D; 260/367; 8/643; 8/675; 524/242; 524/358
[58] Field of Search ................... 106/193 D; 544/188; 260/37 P, 40 P, 42.21, 316, 367, 378, 379, 381; 8/643, 675

[56] References Cited

U.S. PATENT DOCUMENTS

| | | | |
|---|---|---|---|
| 2,151,635 | 3/1939 | Dettwyler | 260/367 |
| 3,935,208 | 1/1976 | Altermatt | 260/249 |
| 4,041,053 | 8/1977 | Herzog | 260/381 |

*Primary Examiner*—Allan Lieberman
*Assistant Examiner*—P. Short
*Attorney, Agent, or Firm*—Harry Falber

[57] ABSTRACT

A process for the mass coloration of organic material of high molecular weight, which comprises the use of a mixture of anthraquinone compounds of the formula:

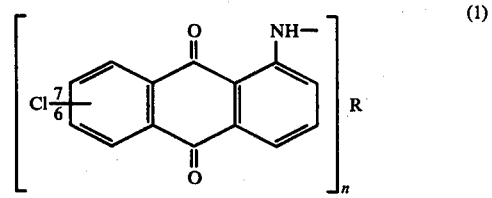

wherein n is 1 or 2, R, if n is 1, represents a substituted or unsubstituted anthraquinone radical, and, if n is 2, R represents a radical of the formula:

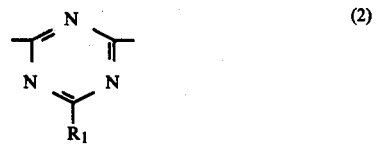

wherein $R_1$ represents hydrogen, alkyl of 1 to 4 carbon atoms, phenyl or methylmercapto as colorant, having good thermostability, solubility when incorporated in the polymer melt, and resistance to the staining of other material during thermofixation.

2 Claims, No Drawings

PROCESS FOR COLORING ORGANIC MATERIAL OF HIGH MOLECULAR WEIGHT

This is a continuation of application Ser. No. 968,318, filed on Dec. 11, 1978, now abandoned.

The present invention relates to a process for the mass colouration of organic material of high molecular weight, especially polyester, which comprises the use of mixtures of anthraquinone compounds of the formula:

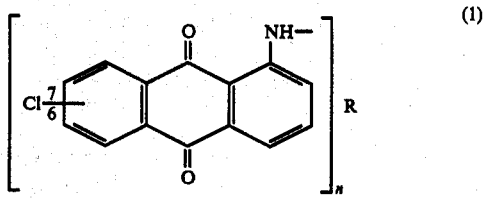

wherein n is 1 or 2, R, if n is 1, represents a substituted or unsubstituted anthraquinone radical, and, if n is 2, R represents a radical of the formula:

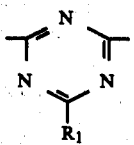

wherein $R_1$ represents hydrogen, alkyl of 1 to 4 carbon atoms, phenyl or methylmercapto.

Preferred colourant mixtures of the formula (1) are those wherein n is 1 and R represents an anthraquinone radical which can be substituted by chlorine, methyl, hydroxyl, methoxy or benzoylamino or by phenyl, phenoxy or phenylmercapto which are unsubstituted or substituted by 1 or 2 halogen atoms or alkyl of 1 to 4 carbon atoms.

Particularly preferred colourant mixtures of the formula (1) are those wherein n is 1 and R represents an unsubstituted 1-anthraquinone radical.

The most preferred colourant mixtures are those of the formula:

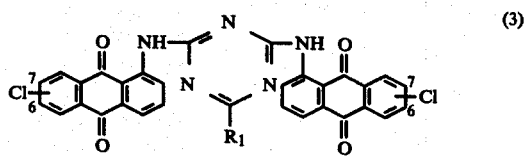

wherein $R_1$ is as defined for formula (1). Preferably, $R_1$ in formula (3) represents hydrogen, alkyl of 1 to 4 carbon atoms or phenyl.

The mixtures of anthraquinone compounds of the formula (1) to be used according to the invention can be obtained in a particularly simple manner by condensation of the mixtures of 1,6- and 1,7-dichloroanthraquinone formed as byproduct or waste product in different processes, with aminoanthraquinones or diamino-1,3,5-triazine derivatives. These dichloroanthraquionone mixtures are formed, for example, during the halogenation of aqueous solutions of anthraquinonesulfonic acids, or of industrial wastewaters which contain these anthraquinonedisulfonic acid mixtures (cf. Ullmanns Encyclopädie der techn. Chemie, 4th edition, Vol. 7, p. 589). Suitable dichloroanthraquinone mixtures are also obtained in the reaction of elementary chlorine with industrial nitration products of anthraquinone.

The condensation is carried out in conventional manner in a solvent of higher boiling point, for example toluene, xylene, chlorobenzene, o-dichlorobenzene, trichlorobenzene, naphthalene or, in particular, nitrobenzene, in the presence of an acid acceptor, for example sodium carbonate or sodium acetate, or potassium carbonate or potassium acetate, and of a suitable copper catalyst.

A particularly suitable process for the production of dichloroanthraquinone mixtures of the formula (1) is that of Swiss Pat. No. 485,644, wherein 1 mole of a triazine compound of the formula:

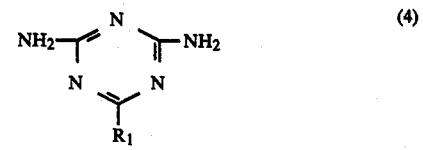

wherein $R_1$ has the given meaning, is condensed with 2 moles of a mixture of 1,6-dichloroanthraquinone and 1,7-dichloroanthraquinone, in the presence of an adduct of a copper(I) halide, preferably of copper(I) iodide, and of a tertiary base, preferably a pyridine base, as catalyst.

The following aminoanthraquinones are examples of suitable starting compounds for the production of anthraquinone compounds of the formula (1) if n is 1:
1-aminoanthraquinone,
1-amino-4,5- or -8-benzoylaminoanthraquinone,
1-amino-4-hydroxyanthraquinone,
1-amino-4-methoxyanthraquinone,
1-amino-4,5- or -8-phenylmercaptoanthraquinone,
1-amino-6- or -7-chloroanthraquinone,
2-aminoanthraquinone,
or their mixtures, whilst the following triazine compounds are examples of suitable starting materials for the production of anthraquinone compounds of the formula (3):
2,4-diamino-1,3,5-triazine,
2,4-diamino-6-methyl-1,3,5-triazine,
2,4-diamino-6-ethyl-1,3,5-triazine,
2,4-diamino-6-n-propyl-1,3,5-triazine,
2,4-diamino-6-isopropyl-1,3,5-triazine,
2,4-diamino-6-butyl-1,3,5-triazine,
2,4-diamino-6-phenyl-1,3,5-triazine,
2,4-diamino-6-methylmercapto-1,3,5-triazine.

The triazine compounds can be obtained in known manner by condensation of carboxylic acid nitriles with dicyandiamide or from the corresponding dichlorotriazines by reaction with ammonia.

In addition to having good thermostability, the colourant mixtures of the present invention have good solubility when incorporated in the polymer melt. This solubility is greater than that of the analogous non-chlorinated compounds. This feature is surprising on account of the higher molecular weight and was not to be expected. Compared with the simpler anilino derivatives of the mixtures of 6- and 7-chloroanthraquinone of German Offenlegungsschrift No. 2,513,950, the colourant mixtures of the present invention, when incorporated in polyester, have a better behaviour in respect of the staining of other fabric during thermofixation. In some cases they also produce brighter colourations.

Examples of organic material of high molecular weight which can be coloured in the mass are: cellulose ethers, cellulose esters, acetyl cellulose, nitrocellulose, polyurethane and especially polyolefins, such as polyethylene, polypropylene, polyacrylates, polystyrene and their copolymers, such as ABS copolymers, and, in particular, polyester.

The invention is illustrated by the following Examples, in which parts and percentages are by weight unless otherwise indicated.

EXAMPLES 1–8

A solution of 1.6 parts of copper(I) iodide in 9 parts of pyridine is added to 36.6 parts of an industrial mixture of 1,6- and 1,7-dichloroanthraquinone (41.4% of 1,6-dichloroanthraquinone and 53.1% of 1,7-dichloroanthraquinone), 11.2 parts of 2,4-diamino-6-phenyl-1,3,5-triazine and 16 parts of anhydrous sodium carbonate, and the reaction mixture is stirred in 200 parts of nitrobenzene for 18 hours at 150°–155° C. while distilling off the water formed during the reaction. With stirring, the reaction mixture is cooled to 100° C. The precipitated crystalline reaction product is collected by suction and washed successively with warm nitrobenzene of 100° C., hot alcohol and finally with hot water and then dried in vacuo at 80°–90° C., affording 37.5 parts of a colourant mixture of the empirical formula $C_{37}H_{19}Cl_2N_5O_4$.

Analysis: calculated: C: 66.48; H: 2.85; N: 10.48; Cl: 10.61%; Found: C: 66.5; H: 2.9; N: 10.8; Cl: 10.3%.

Yellow colourations of excellent fastness properties are obtained when this colourant mixture is incorporated in polyester in accordance with the particulars of Example 3.

Compared with the 2,4-bis-(1- anthraquinonyl)-amino-6-phenyl-1,3,5-triazine of Example 9 of German Auslegeschrift No. 1,283,542, the above mixture of dichloro derivatives has the advantage of better solubility in polyester. Compared with the non-isomeric 6-chloroanthraquinone derivatives of Examples 4 and 5 of German Offenlegunsschrift No. 1,644,521, the above mixture has the advantage of being more readily obtainable and of having a better solubility in polyester.

Analogous colourants are obtained in accordance with the procedure of this Example by condensing equivalent amounts of the following diaminotriazine derivatives, instead of 2,4-diamino-6-phenyl-1,3,5-triazine, with the mixture of 1,6- and 1,7-dichloroanthraquinone:

| Example | triazine derivative | Shade in polyester |
| --- | --- | --- |
| 2 | 2,4-diamino-1,3,5-triazine | yellow |
| 3 | 2,4-diamino-6-methyl-1,3,5-triazine | yellow |
| 4 | 2,4-diamino-6-ethyl-1,3,5-triazine | yellow |
| 5 | 2,4-diamino-6-n-propyl-1,3,5-triazine | yellow |
| 6 | 2,4-diamino-6-i-propyl-1,3,5-triazine | yellow |
| 7 | 2,4-diamino-6-n-butyl-1,3,5-triazine | yellow |
| 8 | 2,4-diamino-6-methylmercapto-1,3,5-triazine | yellow |

EXAMPLES 9 TO 14

50 parts of an industrial mixture of 1,6-dichloroanthraquinone and 1,7-dichloroanthraquinone of the composition referred to in Example 1 are stirred with 38 parts of 1-aminoanthraquinone, 19.2 parts of anhydrous sodium carbonate and 4.4 parts of sodium acetate in 360 parts of nitrobenzene at boiling temperature and freed from any moisture still present. Then 1.8 parts of copper powder are added at 190° C. and the reaction mixture is subsequently stirred for 18 hours at boiling temperature while distilling off the water formed during the reaction. After cooling to room temperature, the crystalline reaction product is collected by suction and washed with a small amount of nitrobenzene, then with alcohol and finally with hot water. The moist product is stirred for 2 hours at 80° C. in 4000 parts of 5% nitric acid to remove any copper still present and filtered warm. The filter cake is washed neutral and dried in vacuo at 80° C., affording 68 parts of a claret-coloured colourant mixture with a chlorine content of 6 to 6.5%, which produces pure red shades of outstanding fastness properties in polyester. Compared with the shades produced with the condensation products of aniline derivatives with the mixtures of 1,6- and 1,7-dichloroanthraquinone obtained according to German Offenlegungsschrift No. 2,513,950, these shades are distinguished by a superior resistance to the staining of other material during thermofixation.

Compared with the unsubstituted di-(1-anthraquinonyl)amine, the colourant mixture of this Example is distinguished by a better solubility in polyester, a purer and more interesting shade and a superior fastness to rubbing of the shade after thermofixation of the coloured material.

Corresponding colourants are obtained by repeating the procedure of this Example but condensing the following 1-aminoanthraquinone derivatives, instead of 1-aminoanthraquinone, with the mixture of 1,6-dichloroanthraquinone and 1,7-dichloroanthraquinone:

| Example | Aminoanthraquinone derivative | Shade in polyester |
| --- | --- | --- |
| 10 | 1-amino-4-hydroxyanthraquinone | violet |
| 11 | 1-amino-4-phenylmercaptoanthraquinone | claret |
| 12 | 1-amino-5-phenylmercaptoanthraquinone | scarlet |
| 13 | 1-amino-4-benzoylaminoanthraquinone | violet |
| 14 | 1-amino-5-benzoylaminoanthraquinone | red |

EXAMPLE 15

In a sealable vessel, non-dulled polyethylene terephthalate granules together with 1% of one of the colourants described in the preceding Examples are shaken for 15 minutes in a tumbler mixer. The uniformly coloured granules are spun to filaments in a melt spinning machine (285° C.±3° C., retention time in the spinning machine about 5 minutes). The filaments are stretched on a draw twister and spooled. Brilliant colours are obtained on account of the solubility of the colourants in polyethylene terephthalate.

The coloured material can be treated and tested as follows:

(a) Thermofixation

A sample of the coloured material is treated for 30 seconds at 180° C. on a precision ironing press and, if desired, subjected additionally to an after-fixation for 30 minutes at 135° C.

(b) Test of fastness to rubbing after thermofixation

Dry, undyed cotton or polyethylene terephthalate fabric is moved to and fro 10 times in a crockometer with a pressure of 900 g and in the course of 10 seconds over a 10 cm long sample of the coloured and thermofixed material. The staining of the uncoloured material is assessed.

(c) Test of staining during thermofixation

A sample of the coloured material together with uncoloured comparison fabric (polyamide, polyester) is treated on a precision ironing press for 30 seconds at 180° C.

EXAMPLE 16

100 parts of low pressure polyethylene (Hostalen GB 6450), part of titanium dioxide (Kronos RN 56) and 0.1 part of the colourant of Example 8 are mixed in a high-speed rotary kneader for about 1 minute and plasticised. The resulting material is then formed to a sheet on a daylight press at 160° to 180° C. A moulded article coloured an intensive yellow shade is obtained. Even after 5 minutes at 280° C., samples exhibit a complete colour stability.

What is claimed is:

1. A process for the mass coloration of organic materials of high molecular weight which comprises incorporating into said material a mixture of anthraquinone compounds of the formula:

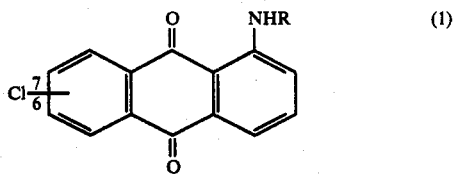

wherein R represents unsubstituted 1-anthraquinone.

2. A colorant mixture corresponding to the formula:

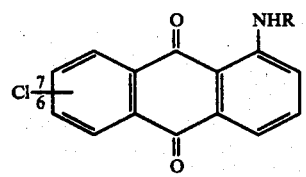

wherein R represents unsubstituted 1-anthraquinone.

* * * * *